United States Patent [19]

Pugliese et al.

[11] Patent Number: 5,818,423
[45] Date of Patent: Oct. 6, 1998

[54] VOICE CONTROLLED CURSOR MOVEMENT

[75] Inventors: Patri J. Pugliese, Medford; Joel M. Gould, Winchester, both of Mass.

[73] Assignee: Dragon Systems, Inc., Newton, Mass.

[21] Appl. No.: 912,751

[22] Filed: Aug. 18, 1997

Related U.S. Application Data

[63] Continuation of Ser. No. 420,245, Apr. 11, 1995, abandoned.

[51] Int. Cl.$^6$ .................................................. G09G 5/08
[52] U.S. Cl. ........................ 345/157; 345/145; 704/275
[58] Field of Search ................................... 345/156, 157, 345/159, 145; 704/200, 246, 251, 275

[56] References Cited

U.S. PATENT DOCUMENTS

| | | |
|---|---|---|
| 4,677,569 | 6/1987 | Nakano et al. . |
| 4,726,065 | 2/1988 | Froessl ........................................ 381/41 |
| 4,776,016 | 10/1988 | Hansen . |
| 4,811,243 | 3/1989 | Racine . |
| 5,377,303 | 12/1994 | Firman . |
| 5,386,494 | 1/1995 | White ..................................... 395/2.84 |
| 5,408,582 | 4/1995 | Colier . |

FOREIGN PATENT DOCUMENTS

| | | |
|---|---|---|
| 0294657 | 12/1988 | European Pat. Off. . |
| 0604340 | 6/1994 | European Pat. Off. . |

OTHER PUBLICATIONS

Electronic mail message dated Feb. 6, 1995.
"Mouse Positioning," Internet Article, dated Feb. 6, 1995.

*Primary Examiner*—Regina Liang
*Attorney, Agent, or Firm*—Fish & Richardson P.C.

[57] ABSTRACT

An element (e.g., a location pointer in a windowed graphical user interface) shown on a computer display is moved toward a target position. A user's input is recognized which identifies a subregion of the display in which the target position is located. The element is moved discontinuously to a location within the identified subregion. Then a next user's input is recognized which identifies a sub-subregion of the subregion of the display in which the target position is located. The element is moved discontinuously to a location within the identified sub-subregion. In another aspect, an element is dragged between two locations on a computer display. User commands are accepted which indicate the two locations. Then the element is dragged between them. The user commands identify a sequence of discontinuous jumps for moving the element to the indicated location.

36 Claims, 20 Drawing Sheets

Microsoft Word
- Document2

VOICE CONTROLLED CURSOR MOVEMENT

This application is a continuation of U.S. application Ser. No. 08/420,245, filed Apr. 11, 1995, now abandoned.

BACKGROUND

This invention relates to voice controlled cursor movement.

As seen in FIGS. 1A and 1B, in a graphical user interface, elements (e.g., windows, buttons, menus) displayed on a monitor 20 of a computer 18 are typically controlled using a mouse 24 and a keyboard 26. The interface elements may also be controlled by a user's spoken commands 12 which are picked up by a microphone 14 and fed through a voice control system 10. After being digitized in an A/D converter 16 in the voice control system, the user's command is "recognized" by a recognition engine 15 (in the form of software running in computer 18). The recognized speech is provided to software applications 17 and the operating system 19 also running on the computer, and corresponding actions are taken. For example, if the voiced command is "button click", the operating system executes the button click at the current location of the cursor, just as if the mouse button had been physically clicked. An example of a voice recognition engine used to control a graphical user interface is the one included in DragonDictate, available from Dragon Systems of Newton, Mass.

As seen in FIG. 2, the graphical user interface may include windows 28, 30 and icons 32 representing files or programs. Windows 28, 30 may be resized, moved, opened, or closed by the user. The windows may overlap to allow viewing of a currently active window 37 and an inactive window 20 and 28.

The cursor 34 (in this case in the form of an arrow) is moved around by the user to indicate locations of interest. For example, if the user wants to launch the SYSEDIT program she moves the cursor to point to the SYSEDIT icon and double clicks the mouse. Also, the user may "drag" the cursor by positioning it at one location, holding down the mouse button, then moving the cursor to another location and releasing the button. This would allow the user to, for example, move the SYSEDIT cursor to a new location within window 30.

To make voice control of a graphical user interface effective, the user should be able to move the cursor around the screen and perform dragging operations using voiced commands. One way to do this is using commands such as "up", "down", "faster", "slower" to cause corresponding motion of the cursor.

SUMMARY

The invention allows rapid relocation and dragging of a cursor using, e.g., voiced commands.

In general, the invention features moving an element (e.g., a location pointer in a windowed graphical user interface) shown on a computer display toward a target position. In the method, a user's input is recognized which identifies a subregion of the display in which the target position is located. The element is moved discontinuously to a location within the identified subregion. Then a next user's input is recognized which identifies a sub-subregion of the subregion of the display in which the target position is located. The element is moved discontinuously to a location within the identified sub-subregion.

Implementations of the invention may include one or more of the following features. The subregion (the sub-subregion) may be one of a grid of nine possible rectangular subregions (sub-subregions) which can be displayed to and identified by the user. The grid may be overlaid on other displayed features. The grid may be formed of windows. The grid may not be displayed when the subgrid is being displayed. The process may be iterated until the user indicates that the method should be ended. The grid may span the entire display, or only a selected portion of the display, e.g., a window. Each subregion (sub-subregion) may have an associated index which is displayed to the user. The user's inputs may be entered as voice commands which include numbers used to indicate the subregion and the sub-subregion. The subregions may be marked with arbitrary labels and the user may designate a subregion by saying one of the labels. The labels may include letters of the alphabet and could be, for example: ABC/DEF/GHI or [top left, top, top-right/left, center, right/bottom-left, bottom, bottom-right]. The user may also specify a distance for moving the element. The element may be moved to the center of the identified subregion. The system may recognize a user's input indicating that the previous step should be undone.

In general, in another aspect, the invention features dragging an element (e.g., any graphical element such as a cursor, an arrow, an icon, or a window) between two locations on a computer display. In the method, user commands are accepted which indicate the two locations. Then the element is dragged between them. The user commands which indicate at least one of the locations identify a sequence of discontinuous jumps for moving the element to the indicated location.

Other advantages and features will become apparent from the following description and from the claims.

DESCRIPTION

Figure 20:
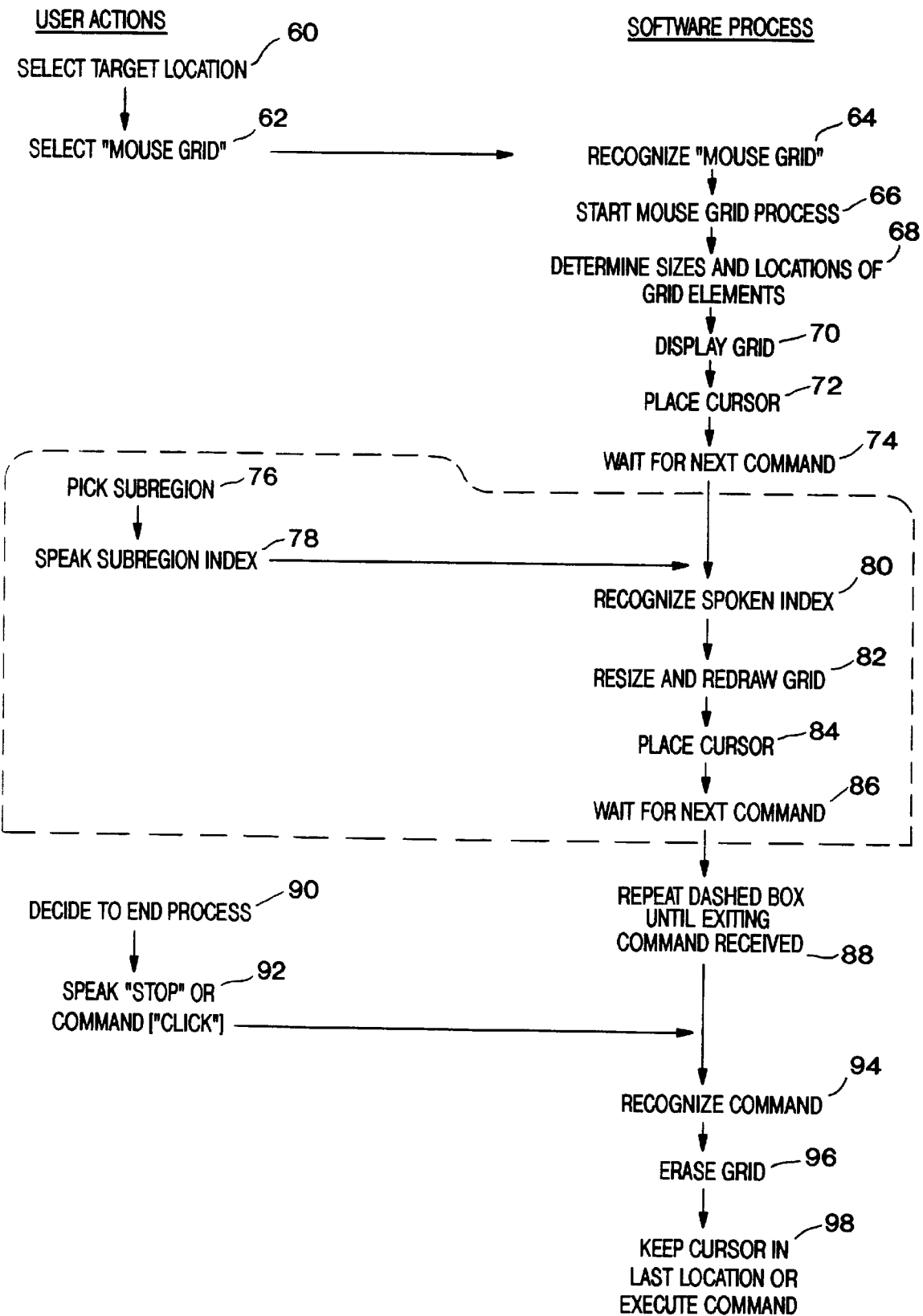
FIG. 20 is a flow diagram.

Voice control of cursor motion and dragging may be done by a "divide-and-conquer" strategy as shown in the sequence of FIGS. 3 through 9 and the flow diagram of FIG. 20. Instead of moving the cursor along a continuous path toward the target location, the cursor is quickly jumped discontinuously through a sequence of discrete positions that home in from its original location to the target location.

The user specifies the discrete positions along the sequence with the aid of a displayed mouse grid 40. The mouse grid 40 subdivides the screen or a portion of the screen into, e.g., nine equal-size subregions. The user indicates the next position for the cursor in the sequence of positions by voicing a command that identifies the subregion which contains the target location. The grid is then immediately scaled down to cover approximately in the identified subregion and the cursor is relocated to the center of that region. The process is repeated (with some modifications mentioned below) until the target (or a position sufficiently close to it) is reached. Nine was chosen as the number of subregions because a number which is the square of an odd integer allows the cursor to be initially placed in the center of the screen, which is comfortable to the user, and the next available number which is the square of an odd integer is twenty-five, which would be a cumbersome number of subregions.

Figure 2:
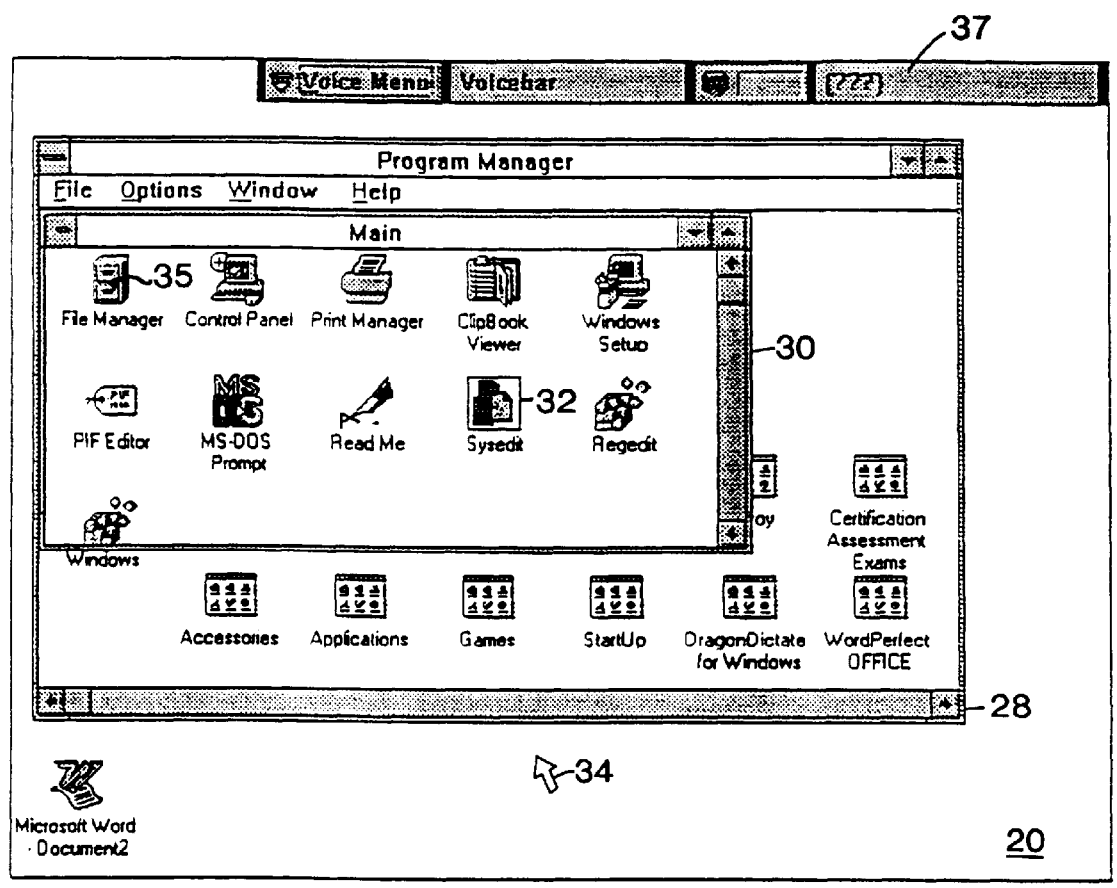
FIGS. 2 through 19 are views of screen displays including a mouse grid.

For example, a user interacting with the screen in FIG. 2 may wish to move the cursor from the position shown to a target position 35 on the File Manager icon (step 60 of FIG. 20). The user first speaks the command "mouse grid", which is recognized by the voice control system. This starts the mouse grid process as seen in steps 62 . . . 66. A small interface window 37 for the voice control system is continually displayed at the upper right hand corner of the screen 20 to inform the user of the state of the voice control system.

Figure 3:
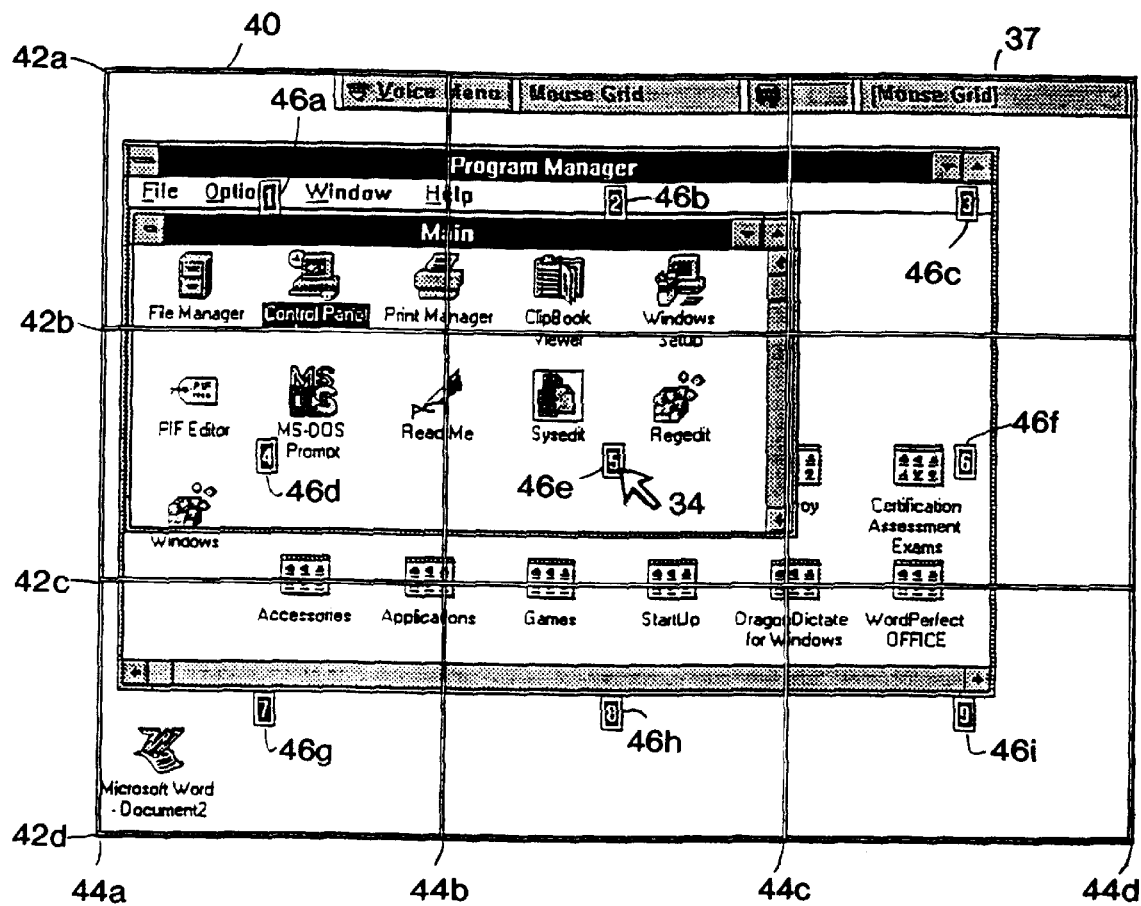

As seen in FIG. 3, as soon as the system recognizes the command, it displays a grid formed of a group of seventeen elements: four evenly spaced thin horizontal windows 42a . . . 42d; four evenly spaced thin vertical windows 44a . . . 44d; and nine small windows 46a . . . 46i, each centered in and bearing an index for the subregion which it occupies. The system also automatically places the cursor at the center of the center subregion (subregion 5), and then waits for the user's next voice command (steps 68 . . . 74).

The seventeen windows which form the grid are all defined to be "on top" of other windows so that the grid always remains visible. Also, because the windows making up the grid are thin or small, they permit the user to see the windows and other elements that lie "below" them.

Figure 4:
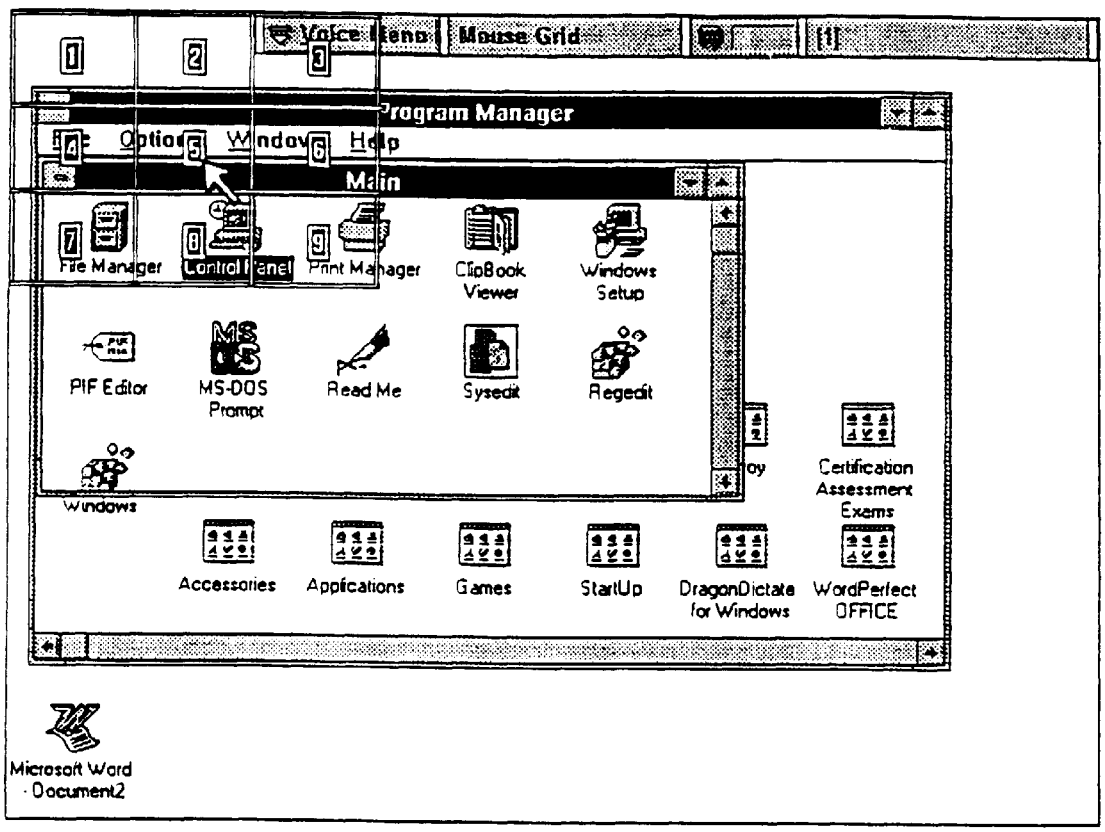

While the grid of FIG. 3 is being displayed, the user speaks "one", the index of the subregion which contains the target location. The system responds, as shown in FIG. 4, by displaying the recognized command [1] in the voice control system window; resizing and relocating the 17 windows of the grid so that the grid essentially occupies the subregion that the user identified by the voiced command; and moving the cursor to the center of the resized and relocated grid to wait for the user's next voice command (steps 76 . . . 86). In the resized grid shown in FIG. 4, the right hand thin vertical window and the bottom thin horizontal window are relocated a few pixels to the right and beneath, respectively, the original subregion 1 of FIG. 3. This ensures that a target location which is under window 44b or window 42b (in FIG. 3) will be exposed to view in FIG. 4.

Figure 5:
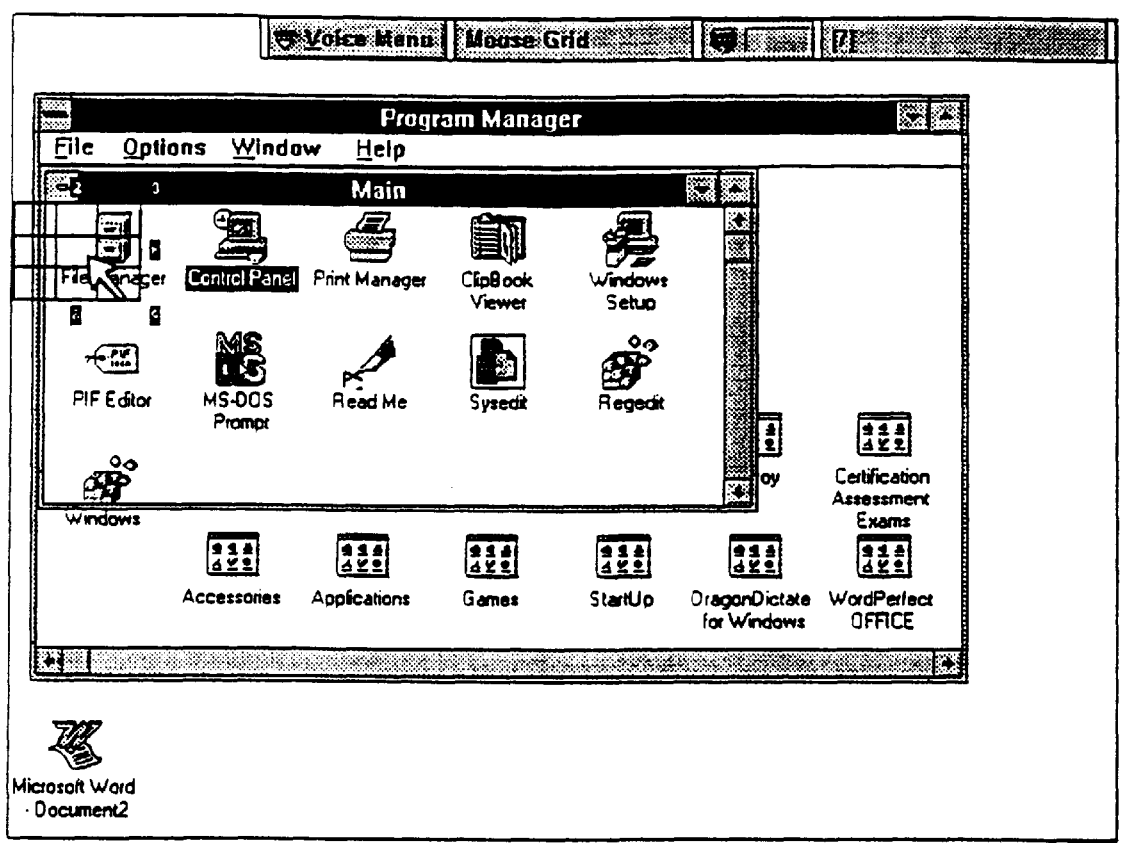

The process is repeated when the user speaks "seven" to indicate the subregion where the file manager icon is displayed. As shown in FIG. 5 (step 88), the grid is again resized and relocated in a similar manner and the cursor is relocated to the center of the center subregion of the new grid. Unlike the larger grids, however, the subregion indices are now shown outside the grid to permit the user to see what is within the grid. The label for the center subregion is omitted, as are any labels that would be outside the border of the screen 20.

Figure 6:
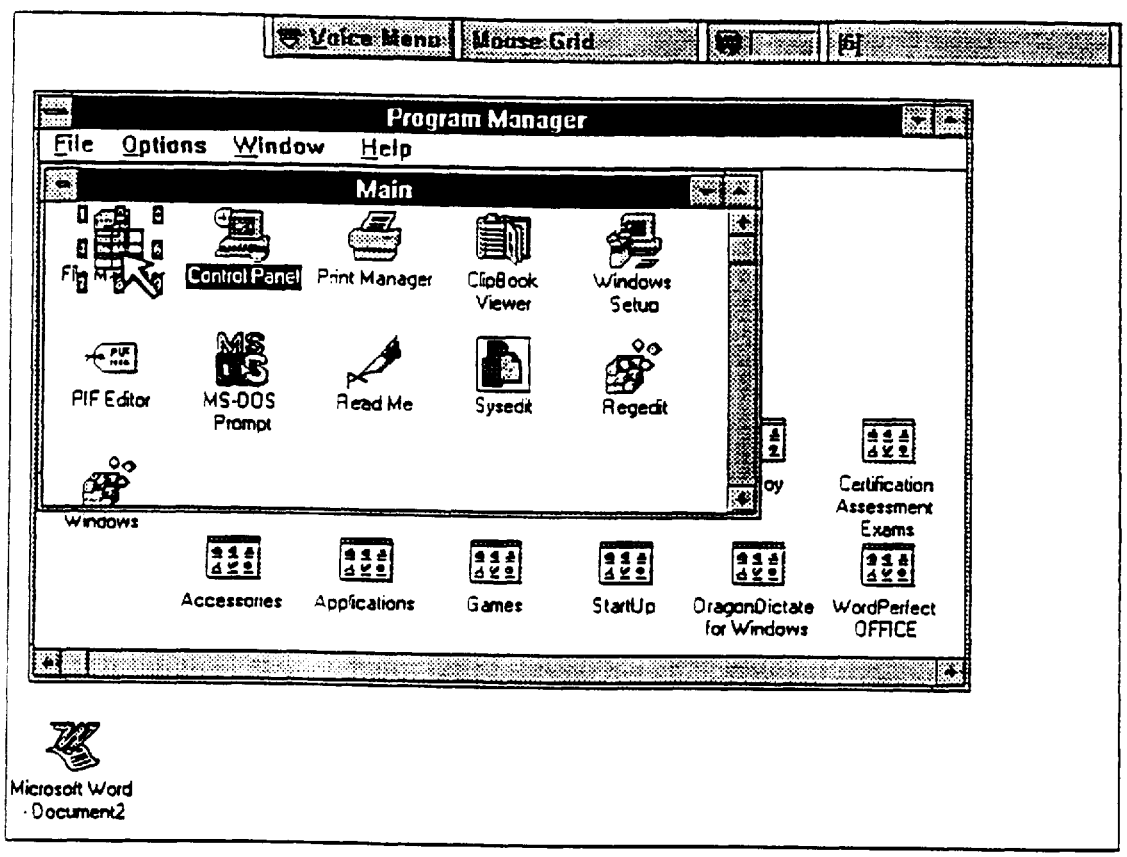
Figure 7:
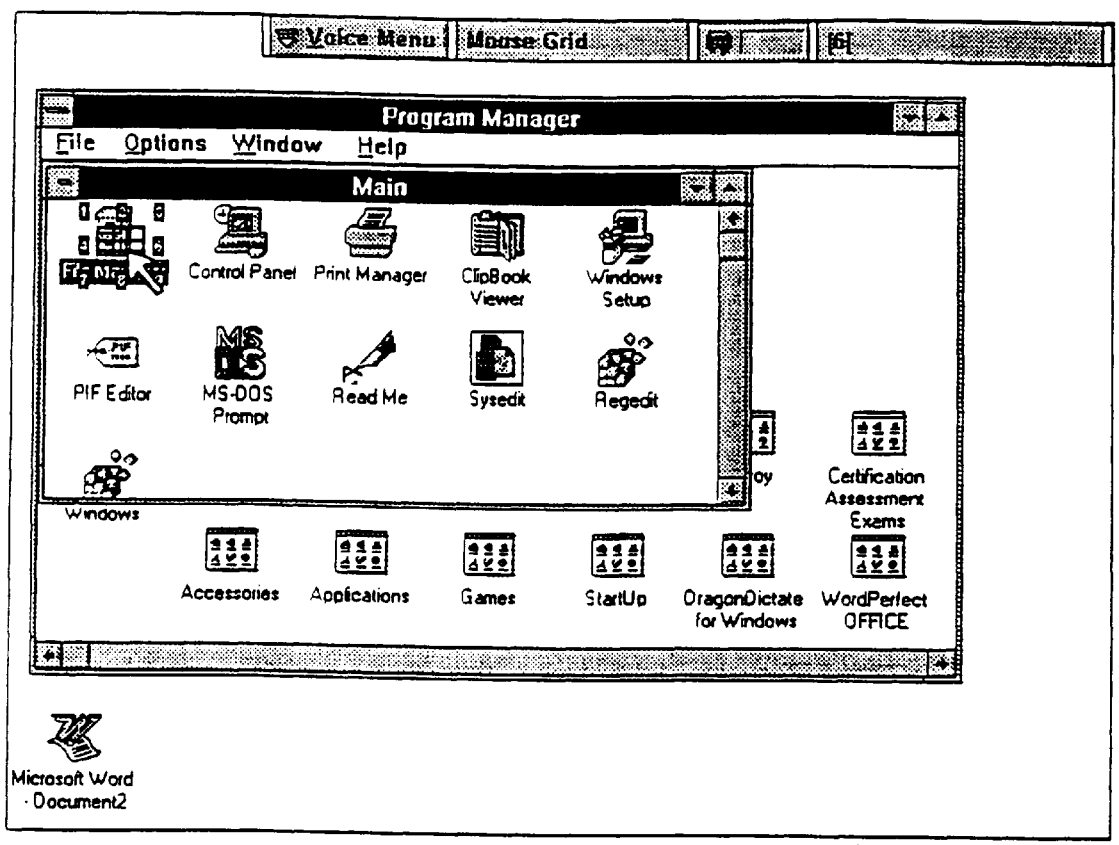

After the user speaks "six", the grid is again redrawn, this time as shown in FIG. 6. The cursor is now positioned to permit the file manager program to be invoked. This could be done by the user speaking an execution command such as "button double click". Thus, by speaking the simple sequence "mouse grid", "1", "7", "6", the user moved the cursor to the target location quickly.

Figure 8:
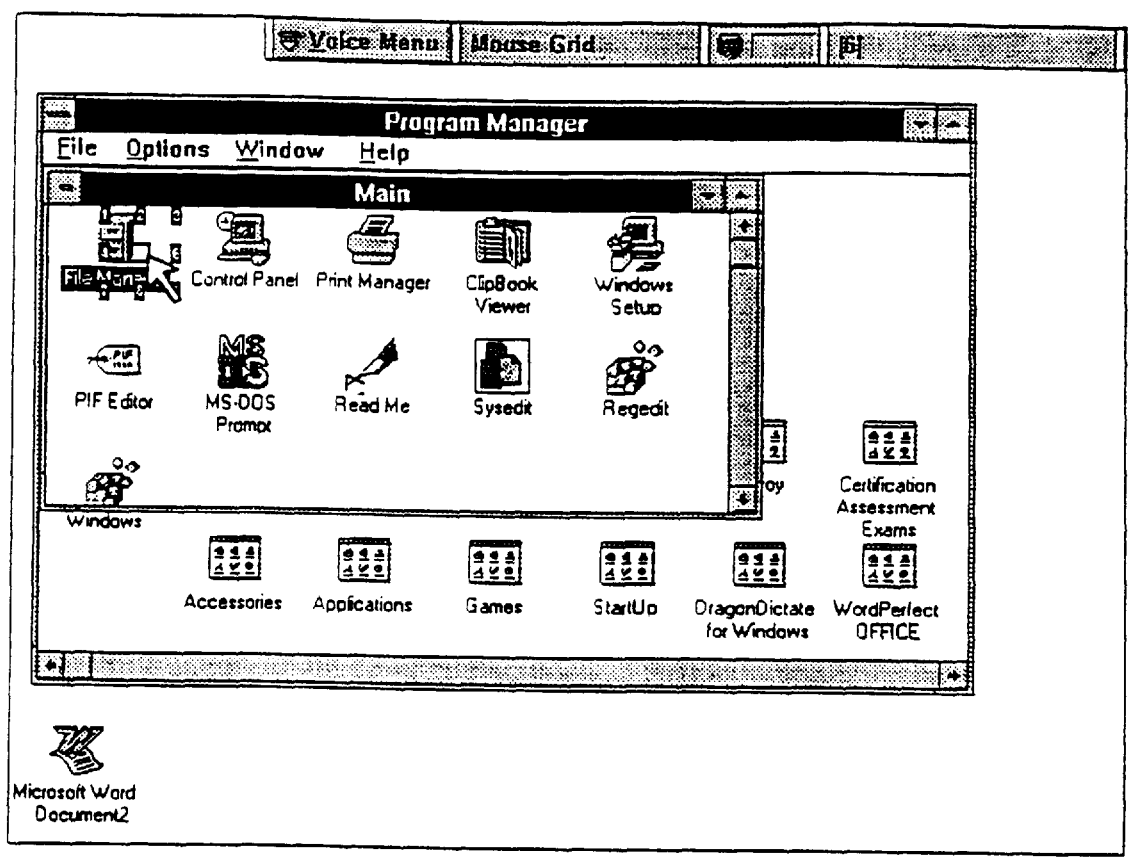
Figure 9:
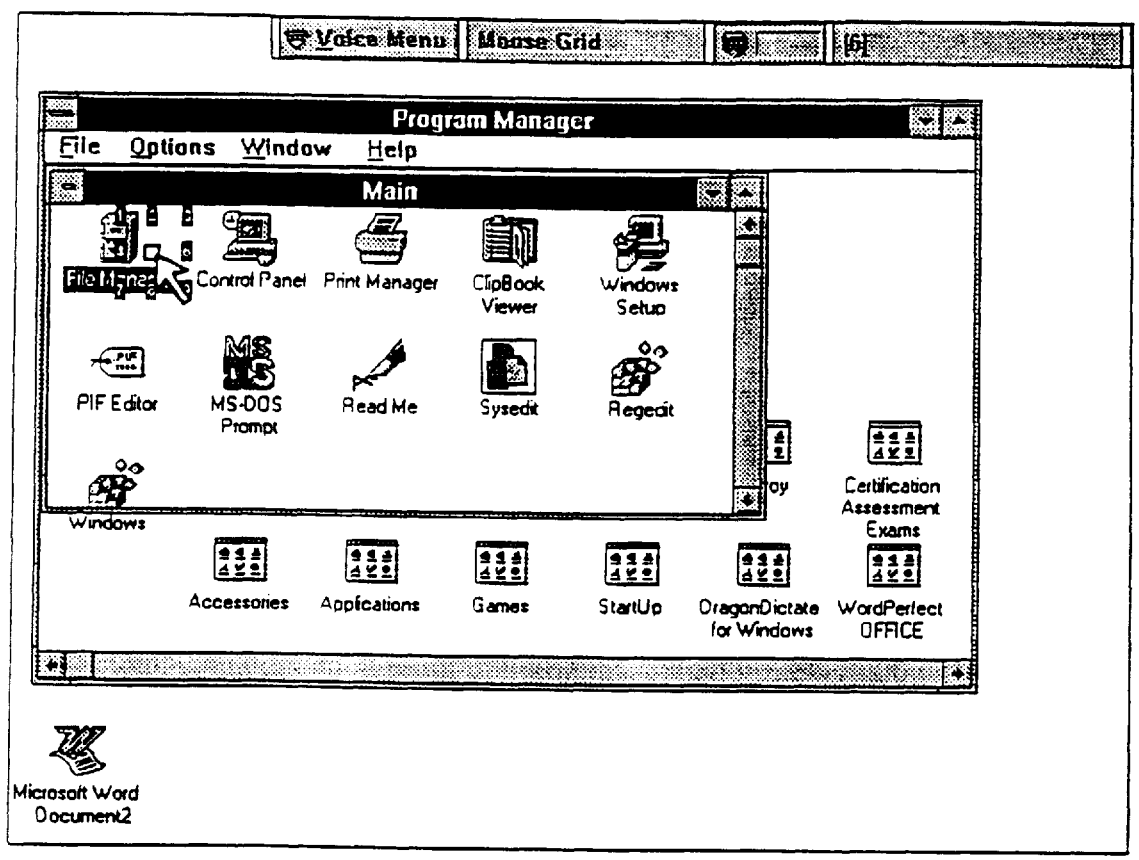

If desired, the cursor location may be controlled even more finely. Beginning in FIG. 7, if the user speaks "six", the grid is reconfigured, as shown in FIG. 8. If the entire smaller grid were redrawn, much of the image within the grid would be obscured by the grid elements. Instead, subregion 6 from the prior screen is redrawn as a single box but without the further subdivisions within the box being shown. By again speaking "six" the user can cause the system to display a smaller box which is representative of, though larger than, the undisplayed subregion 6 within the box shown on FIG. 8.

The process is repeated (FIG. 9) until the cursor reaches the target location. When the grid becomes too small to conveniently undergo further shrinking, it continues to be displayed without further shrinking as a reminder to the user that the system is in mouse grid mode. Spoken voice commands then move the cursor a set number of pixels in the indicated direction, such as three pixels up, down, left or right, e.g., if the user said "six" the cursor would move three pixels to the right.

When the cursor is at the target location, the user may speak a command to remove the mouse grid 40, e.g., "stop", or to take any other action that is permissible, e.g., a mouse click, (steps 90 . . . 98). Or the user may take the action directly by a keystroke or by actually clicking the mouse button.

In another approach, when a subregion is chosen by a user, the portion of the displayed image which is within the subregion may be enlarged to fill the whole screen with the grid superimposed on it. This feature could be made available as a toggled alternative display mode.

As an additional feature, the user may reverse the steps that caused resizing of the grid, for example, to correct a mistake in the sequence. The spoken command to achieve this could be the word "undo". For example, if the user speaks "undo" while viewing FIG. 6, the grid would return to its state shown in FIG. 5. Multiple "undo" steps could be permitted.

Figure 10:
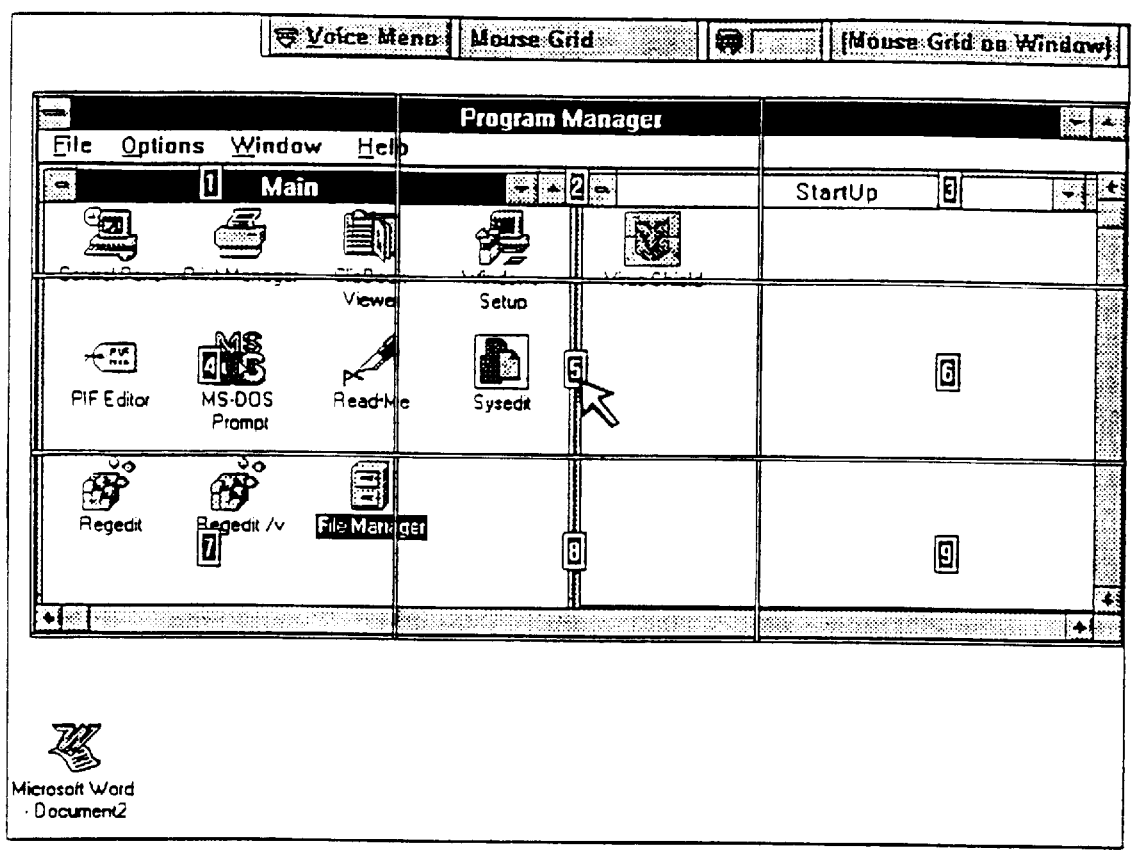
Figure 11:
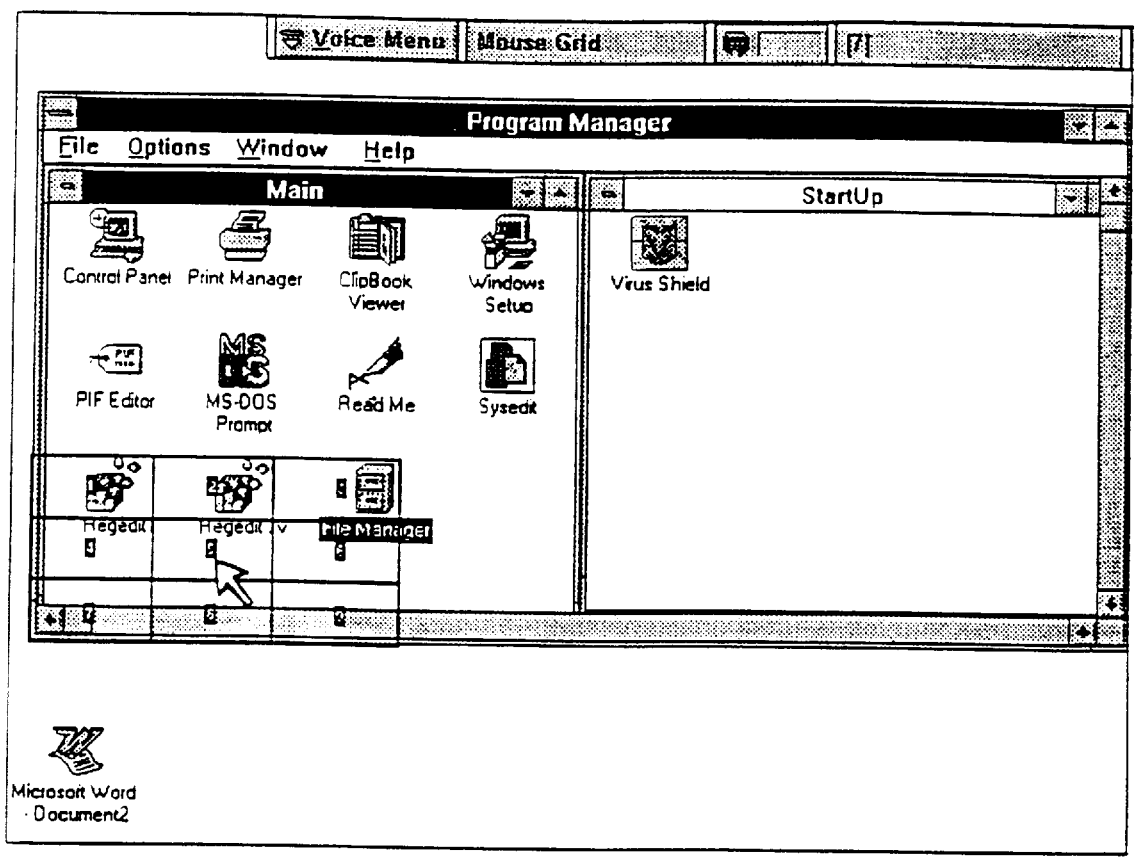
Figure 12:
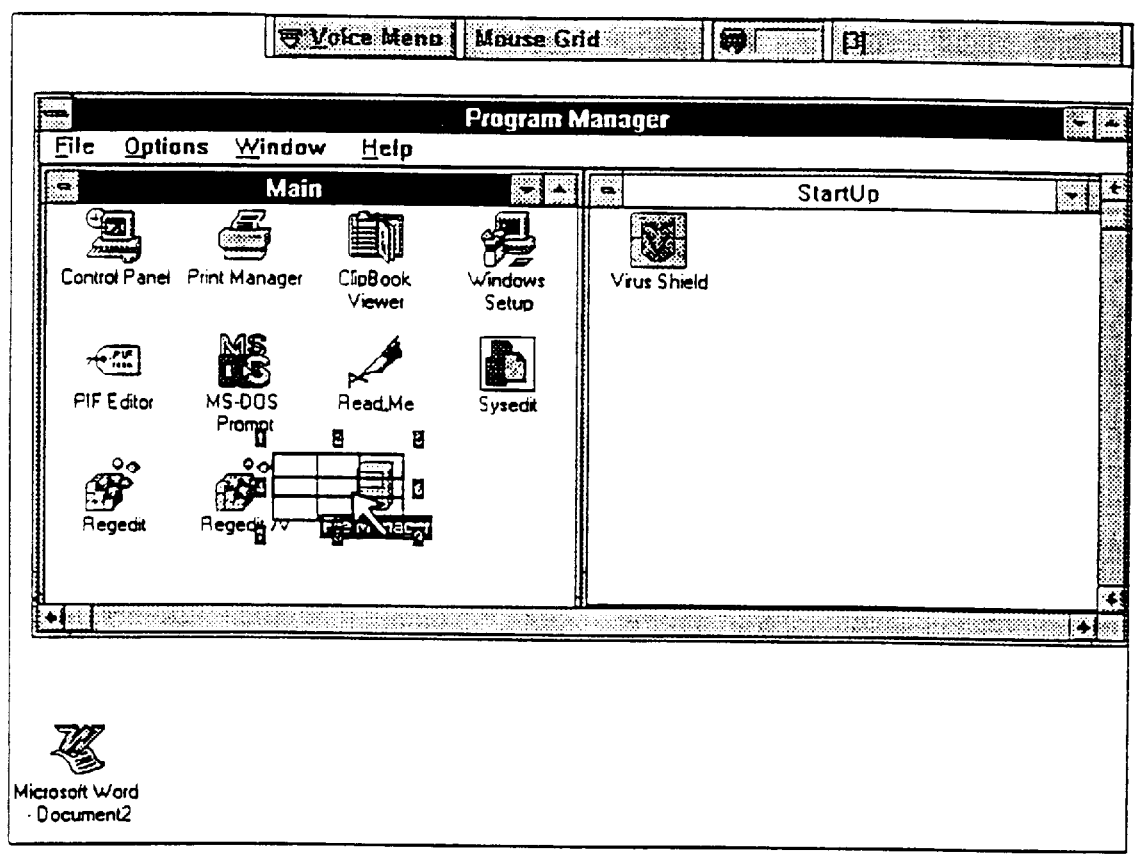
Figure 13:
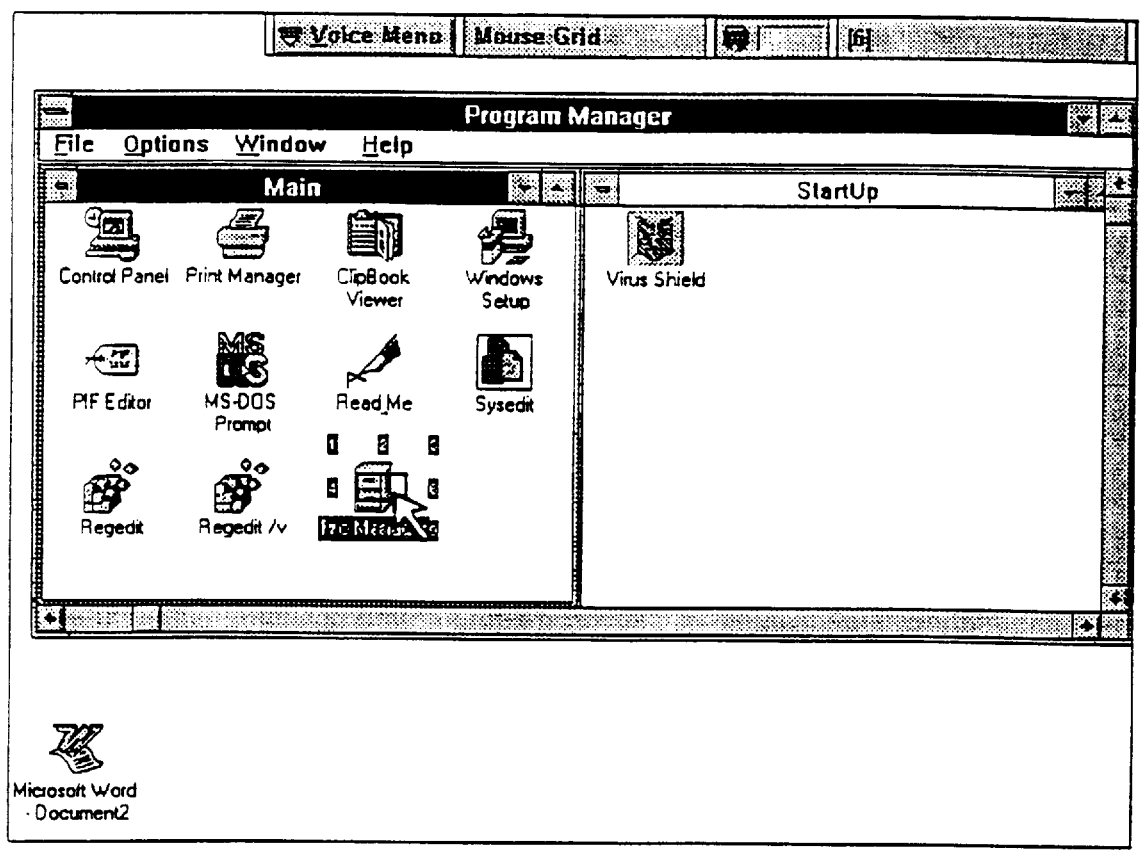

Instead of applying the grid to the full screen, it may be applied to only a selected (e.g., the active) window, by speaking the phrase "mouse grid on window", as seen in FIG. 10. Subsequent grids, as shown in FIGS. 11, 12, and 13 will be redrawn within subregions within the window.

Figure 14:
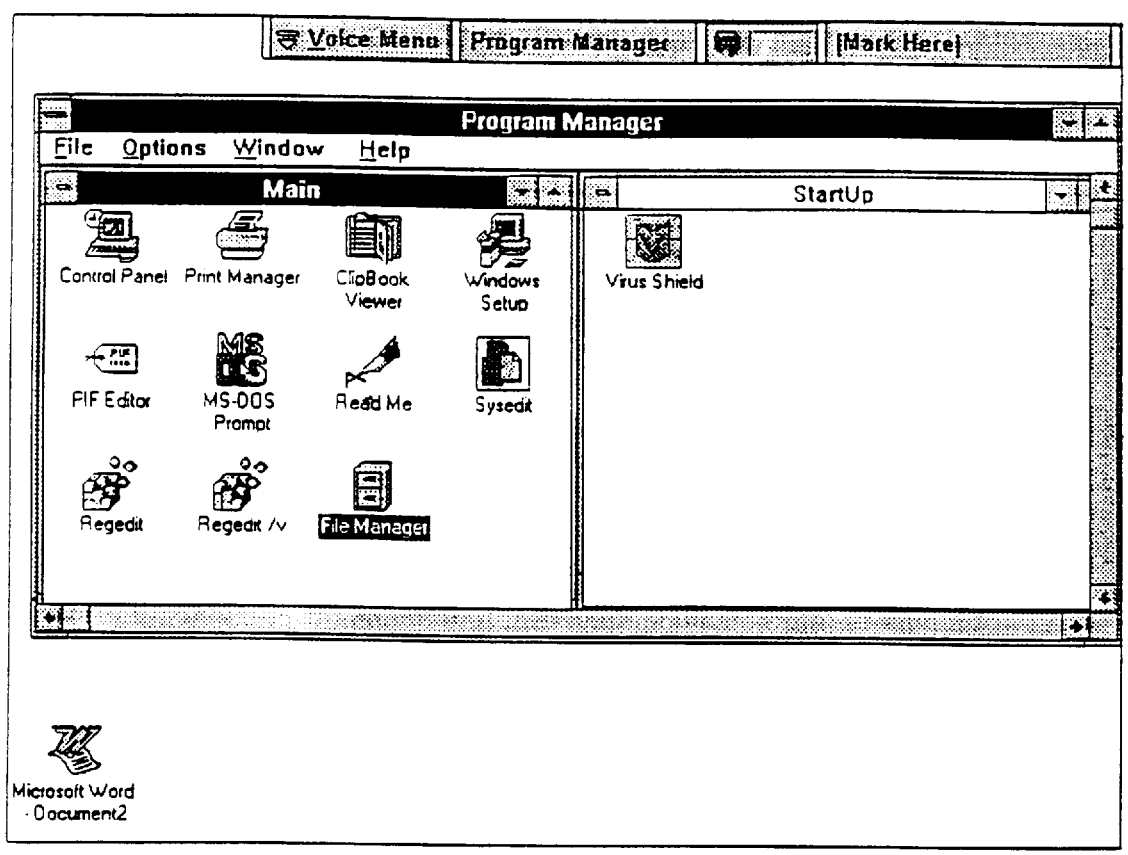

The cursor movement procedure may also form the basis for dragging the cursor. First the user applies the Mouse Grid function to move the cursor to the object to be dragged (e.g., the File Manager icon in FIG. 13). Next the user would speak a phrase such as "mark here", as shown in FIG. 14, to indicate that the place from which the dragging is to occur is the present cursor location. (Or the user could use the mouse to move the cursor to the location that is to be the subject of the "mark here" command.) The file manager title is then highlighted to confirm the action to the user. Although it would be possible for the "mark here" command to actually execute a button click to select the file manager, in one implementation that is not done and the button click must be commanded separately. However the mouse grid would vanish after the "mark here" command.

Figure 15:
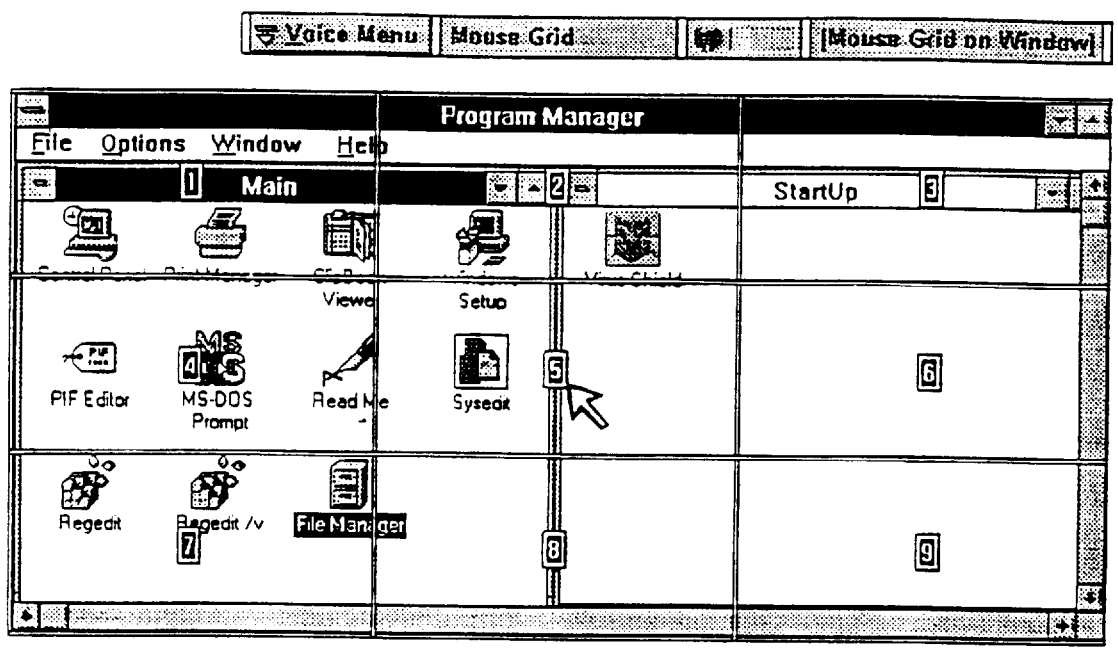
Figure 15:
Figure 16:
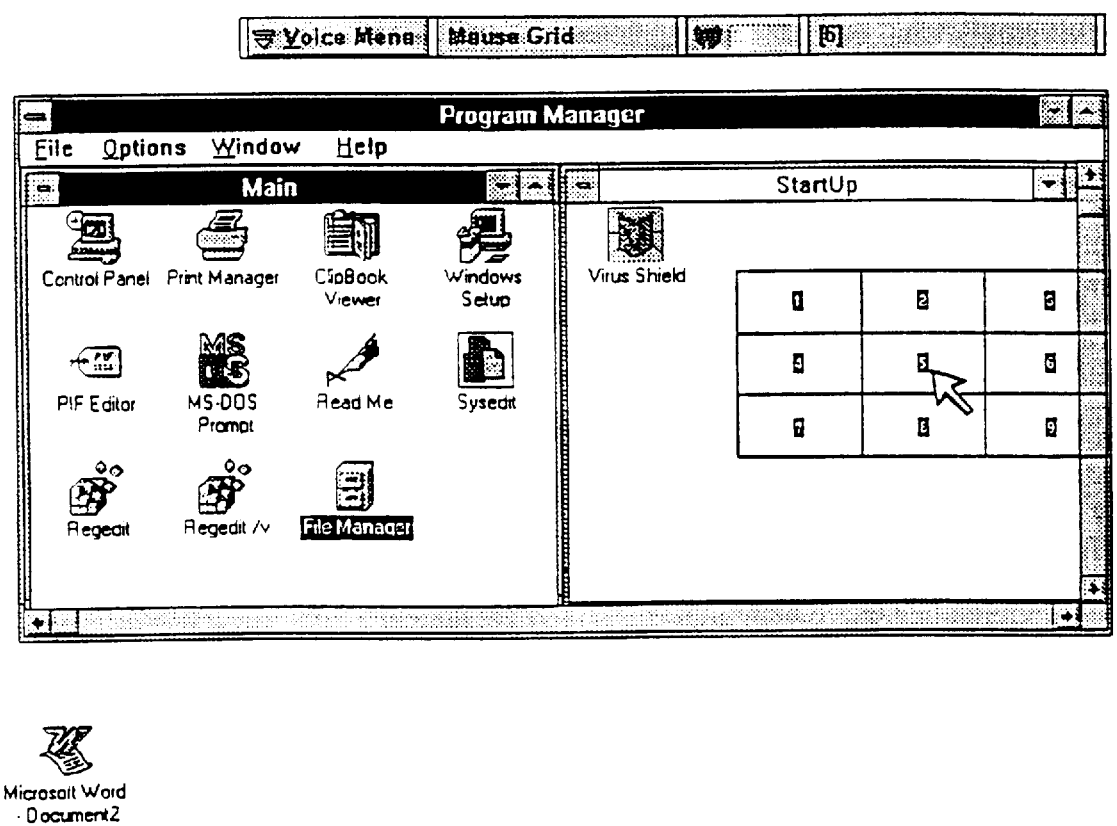
Figure 17:
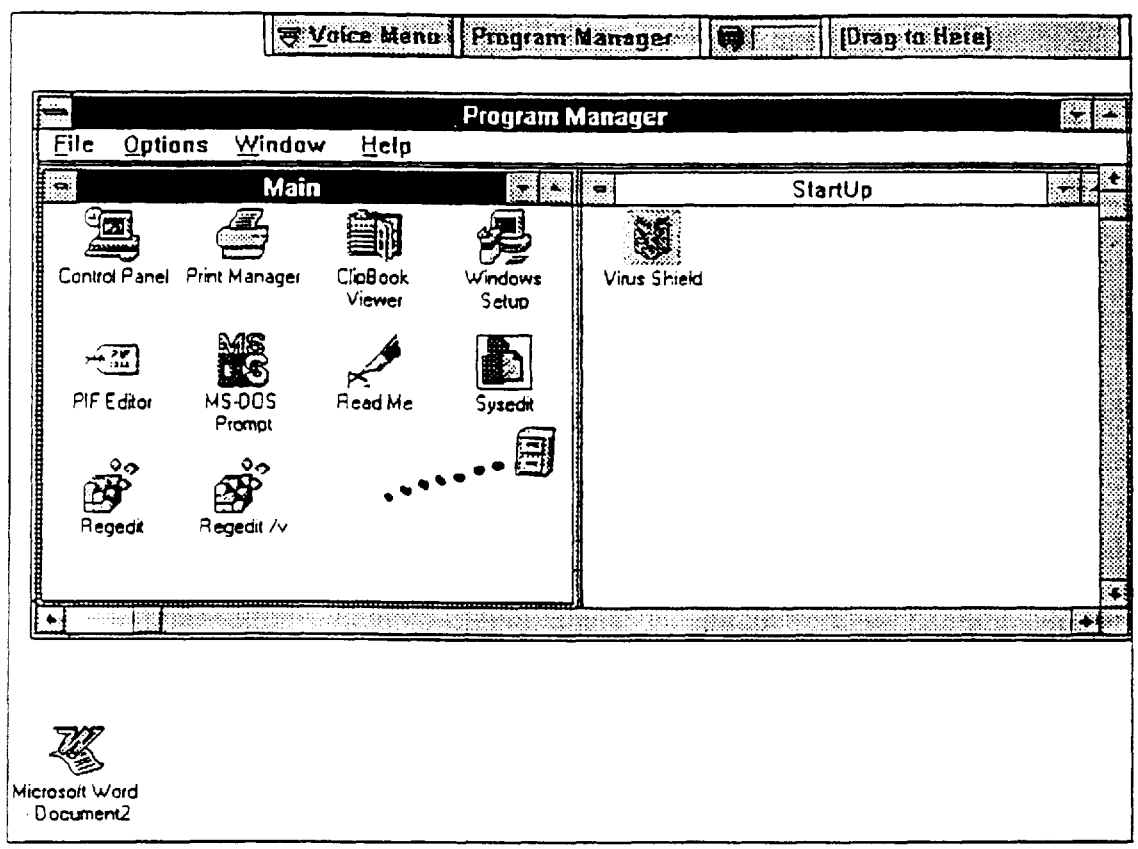
Figure 18:
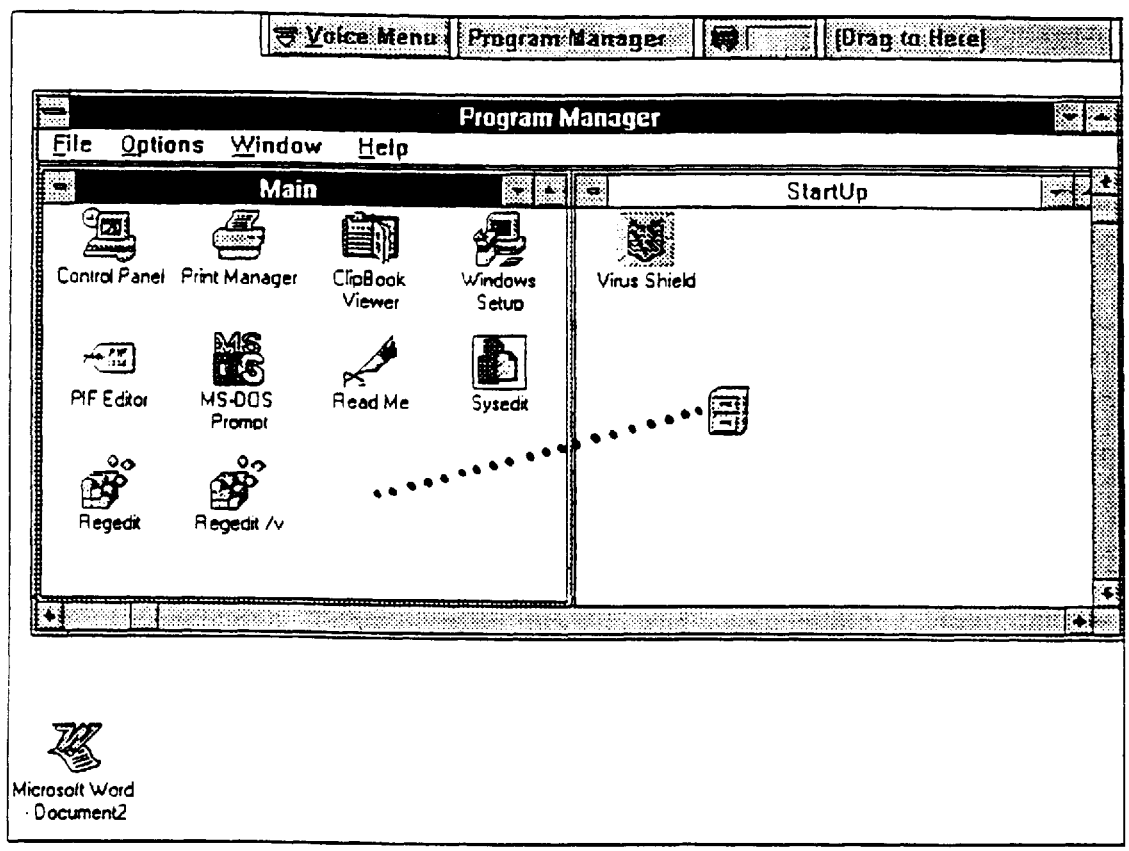
Figure 19:
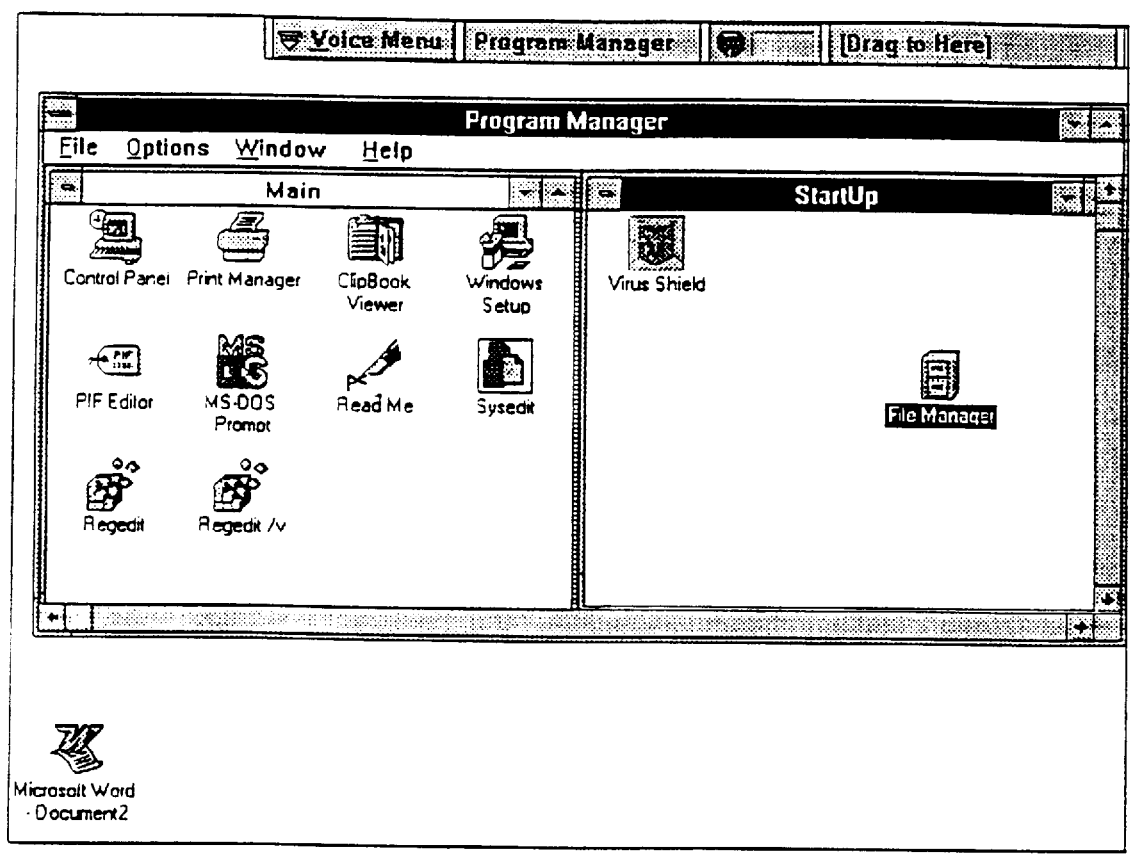

The user then uses the mouse grid (or the mouse itself, if desired)again to mark the location at which the dragging is to end, the destination, as seen in FIGS. 15 and 16. Finally the user speaks a voice command, e.g., "drag to here", telling the computer to execute the dragging action, as shown in FIG. 17. The result is the dragging action shown in the sequence of FIGS. 17 through 19. The activity of dragging is discontinuous from the point of view of the user (i.e., he or she gives a single command, "drag to here"). But the display shows a continuous motion of the element from its old location to the new one.

Figure 1A:
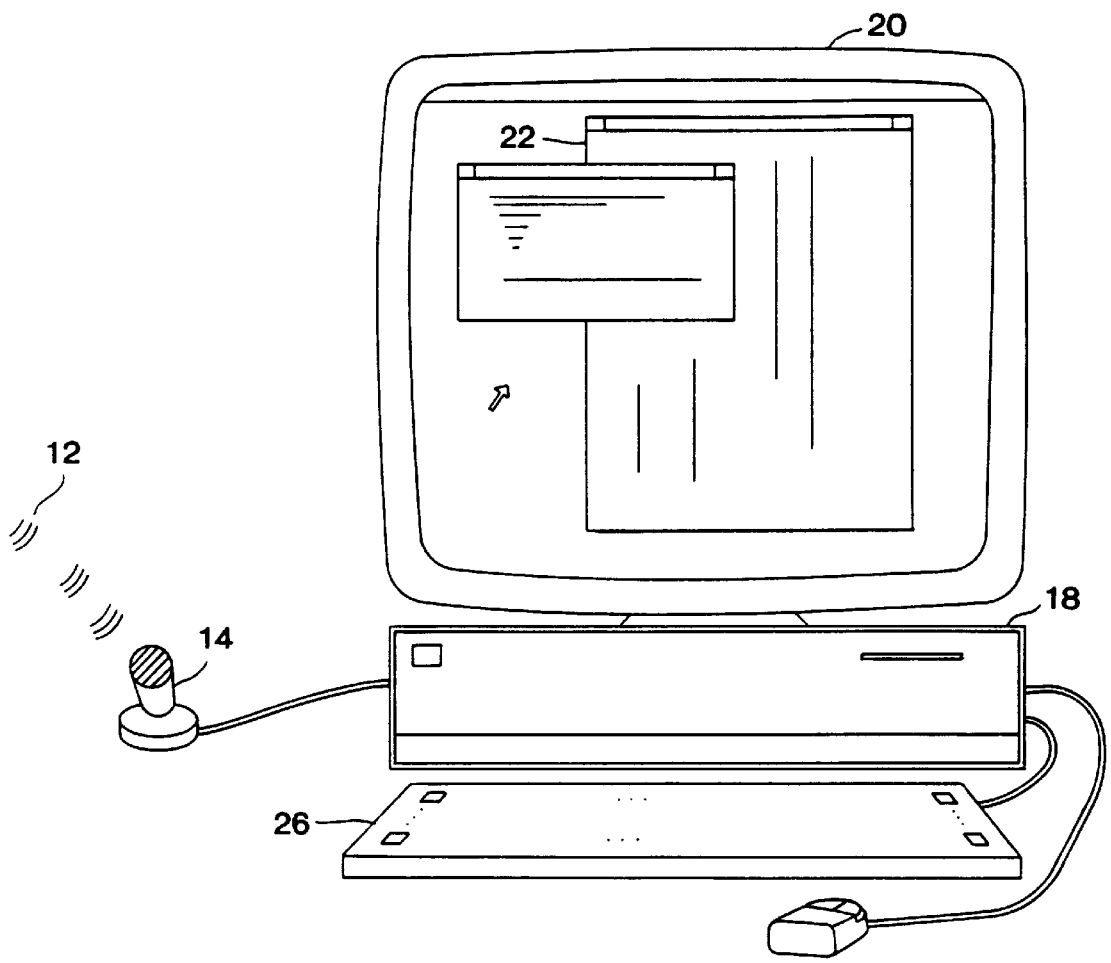
FIG. 1A is a front view of a personal computer.
Figure 1B:
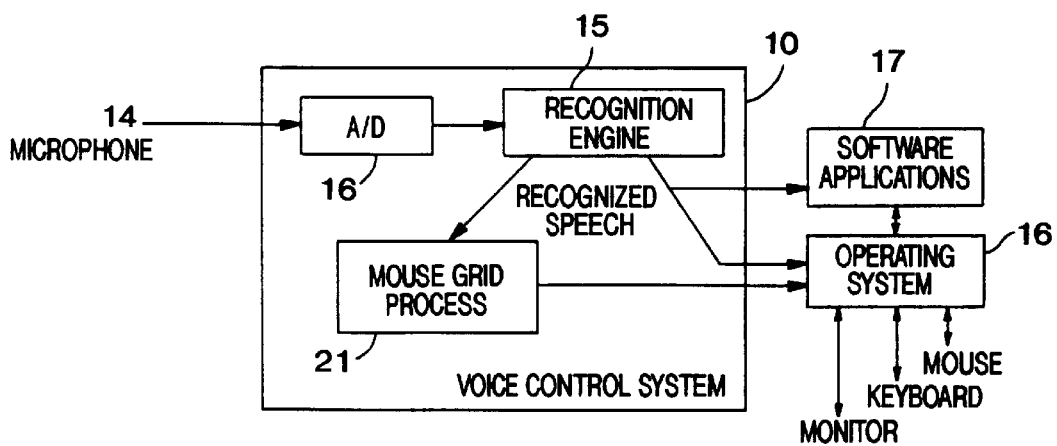
FIG. 1B is a block diagram of a voice control system.

Referring again to FIG. 1B, the recognition engine provides recognized speech commands to a mouse grid process 21. When the recognized speech command is one handled by the mouse grid process, it provides corresponding instructions to the operating system (including Windows) to cause the commanded actions to occur.

A pseudo-code description of one possible implementation of the mouse grid process, suitable for use with DragonDictate, is set forth in Appendix A, and additional explanation is included in Appendix B.

Other embodiments are within the scope of the following claims.

What is claimed is:

1. A method of moving an element shown on a computer display toward a target position, comprising
   a. displaying a first visual element that defines subregions of the display,
   b. recognizing a user's input identifying a subregion of the display in which the target position is located,
   c. moving the element discontinuously to a location within the identified subregion without changing a position on the display at which the identified subregion is displayed, and displaying a second visual element that defines sub-subregions of the identified subregion,
   d. recognizing a next user's input identifying a sub-subregion of the subregion of the display in which the target position is located, and
   e. moving the element discontinuously to a location within the identified sub-subregion without changing a position on the display at which the identified sub-subregion is displayed.

2. The method of claim 1 wherein the subregion is one of a grid of possible subregions which can be identified by the user.

3. The method of claim 2 wherein the grid comprises rows and columns of subregions.

4. The method of claim 3 wherein there are three rows and three columns of subregions in the grid.

5. The method of claim 2 wherein the first visual element comprises the grid.

6. The method of claim 5 wherein the grid is overlaid on other displayed features.

7. The method of claim 5 wherein the grid is formed of windows.

8. The method of claim 2 wherein the grid spans the entire display.

9. The method of claim 2 wherein the grid spans a user selected portion of the display.

10. The method of claim 9 wherein the selected portion comprises a window.

11. The method of claim 1 wherein the subregion is rectangular.

12. The method of claim 1 wherein the sub-subregion is one of a subgrid of possible sub-subregions which can be identified by the user.

13. The method of claim 12 wherein the sub-subregion is rectangular.

14. The method of claim 12 wherein the subgrid comprises rows and columns of subregions.

15. The method of claim 14 wherein there are three rows and three columns of sub-subregions in the subgrid.

16. The method of claim 12 wherein the second visual element comprises the subgrid.

17. The method of claim 16 wherein the first visual element is not displayed when the subgrid is being displayed.

18. The method of claim 1 further comprising iterating steps d and e until the user indicates that the method should be ended.

19. The method of claim 1 wherein each subregion is associated with an index.

20. The method of claim 19 wherein the index of each subregion is displayed.

21. The method of claim 19 wherein each sub-subregion is associated with an index.

22. The method of claim 21 wherein the index of each sub-subregion is displayed.

23. The method of claim 1 wherein the user's input is entered by voice commands.

24. The method of claim 23 wherein the subregions are marked with arbitrary labels and the user designates a subregion by saying one of the labels.

25. The method of claim 24 wherein the labels comprises letters of the alphabet.

26. The method of claim 24 wherein the labels are ABC/DEF/GHI or.

27. The method of claim 23 wherein the voice commands include numbers used to indicate the subregion and the sub-subregion.

28. The method of claim 1 further comprising
   recognizing a user's input specifying a distance for moving the element, and
   moving the element the specified distance.

29. The method of claim 1 wherein the element comprises a location pointer in a windowed graphical user interface.

30. The method of claim 1 wherein the element is moved to the center of the identified subregion.

31. The method of claim 1 further comprising
   after step e, recognizing a user's input indicating that the previous step should be undone, and
   in response, returning to step a.

32. The method of claim 1 further comprising
   using steps a through e to mark a location from which or to which dragging is to occur, and
   causing dragging from or to the marked location.

33. The method of claim 1, wherein the first visual element comprises a grid that divides the display into subregions.

34. The method of claim 33, wherein the second visual element comprises a grid that divides the identified subregion into sub-subregions.

35. A method of moving an element shown on a computer display toward a target position, comprising
   recognizing a user's voiced input identifying an index of a rectangular subregion of the display in which the target position is located, the subregion being one of a grid of nine possible subregions which are displayed to and may be identified by the user,
   b. moving the element discontinuously to a location within the identified subregion without changing a position on the display at which the identified subregion is displayed, and displaying a subgrid that defines nine rectangular sub-subregions of the identified subregion,
   c. recognizing a next user's voiced input identifying an index of a rectangular sub-subregion of the subregion of the display in which the target position is located, the sub-subregion being from the subgrid of nine possible sub-subregions which are displayed to and can be identified by a user,
   d. moving the element discontinuously to a location within the identified sub-subregion without changing a position on the display at which the identified sub-subregion is displayed.

36. Apparatus for moving an element shown on a computer display toward a target position, comprising
   a recognition device which recognizes a user's input identifying a subregion of the display in which the target position is located and a next user's input identifying a sub-subregion of the subregion of the display in which the target position is located, a display controller which moves the element discontinuously to a location within the identified subregion without changing a position on the display at which the identified subregion is displayed, displays a visual element that defines sub-subregions of the subregion, and moves the element discontinuously to a location within the identified sub-subregion without changing a position on the display at which the identified sub-subregion is displayed.

* * * * *